(12) United States Patent
Verduin et al.

(10) Patent No.: US 9,125,520 B2
(45) Date of Patent: Sep. 8, 2015

(54) BEVERAGE PREPARATION DEVICE WITH A DEFORMABLE OUTLET PASSAGE

(75) Inventors: Menno Alexander Verduin, Alkmaar (NL); Maximiliaan Noordanus, Noord Scharwoude (NL)

(73) Assignee: Bravilor Holding B.V. (NL)

( * ) Notice: Subject to any disclaimer, the term of this patent is extended or adjusted under 35 U.S.C. 154(b) by 180 days.

(21) Appl. No.: 14/003,747

(22) PCT Filed: Mar. 6, 2012

(86) PCT No.: PCT/NL2012/050138
§ 371 (c)(1),
(2), (4) Date: Oct. 22, 2013

(87) PCT Pub. No.: WO2012/121598
PCT Pub. Date: Sep. 13, 2012

(65) Prior Publication Data
US 2014/0034676 A1 Feb. 6, 2014

(30) Foreign Application Priority Data
Mar. 9, 2011 (NL) ........................................ 2006361

(51) Int. Cl.
B67D 7/80 (2010.01)
A47J 31/46 (2006.01)
A47J 31/54 (2006.01)
A47J 31/56 (2006.01)

(52) U.S. Cl.
CPC ................ *A47J 31/46* (2013.01); *A47J 31/545* (2013.01); *A47J 31/56* (2013.01)

(58) Field of Classification Search
CPC ......... A47J 31/36; A47J 31/46; A47J 31/545; B65D 47/2031
USPC ........ 222/54, 146.2, 491, 494–496, 566, 575; 99/279, 280, 288, 300, 302 R; 239/601, 239/602, 533.13, 543
See application file for complete search history.

(56) References Cited

U.S. PATENT DOCUMENTS 2,771,320 A * 11/1956 Korwin .......................... 239/279
2,786,656 A * 3/1957 Corneil ........................... 366/11
(Continued)

FOREIGN PATENT DOCUMENTS

DE 10 2009 002657 A1 10/2010
NL 1 023 023 C2 9/2004

OTHER PUBLICATIONS

International Search Report of PCT/NL2012/050138 dated Jun. 25, 2012.

*Primary Examiner* — Frederick C Nicolas
*Assistant Examiner* — Randall Gruby
(74) *Attorney, Agent, or Firm* — Morgan, Lewis & Bockius LLP

(57) ABSTRACT

Beverage preparation device provided with a liquid reservoir, a dispensing line connected to the reservoir and a pump for displacing liquid from the liquid reservoir to the dispensing line, wherein the pump is connected to a control unit and is configured to supply liquid to the dispensing line at a first flow rate and at a second flow rate which is greater than the first flow rate, characterized in that the dispensing line comprises an outlet passage with a peripheral wall provided with at least one deformable wall section, which peripheral wall surrounds a relatively small dispensing opening at the first flow rate and surrounds a larger dispensing opening at a second flow rate.

12 Claims, 3 Drawing Sheets

(56) References Cited

U.S. PATENT DOCUMENTS

| | | | |
|---|---|---|---|
| 2,940,251 A * | 6/1960 | Prentiss | 60/242 |
| 3,136,052 A * | 6/1964 | Pickart | 72/370.12 |
| 3,255,937 A * | 6/1966 | Jarrett | 222/480 |
| 3,584,786 A * | 6/1971 | Johnson | 239/568 |
| 3,687,375 A * | 8/1972 | Griffiths | 239/557 |
| 3,731,517 A * | 5/1973 | Johnson | 72/370.27 |
| 4,109,836 A * | 8/1978 | Falarde | 222/494 |
| 4,240,482 A * | 12/1980 | Andersson et al. | 222/564 |
| 4,583,449 A * | 4/1986 | Dangel et al. | 99/279 |
| 5,762,007 A * | 6/1998 | Vatsky | 110/264 |
| 5,984,209 A * | 11/1999 | Weth | 239/547 |
| 6,264,066 B1 * | 7/2001 | Vincent et al. | 222/95 |
| 6,453,803 B1 * | 9/2002 | Sodeyama et al. | 99/348 |
| 6,640,847 B2 * | 11/2003 | Verhoeven | 141/98 |
| 6,766,838 B1 * | 7/2004 | Zywicki | 141/286 |
| 2006/0255066 A1 * | 11/2006 | Kannar et al. | 222/145.3 |
| 2008/0245238 A1 * | 10/2008 | Huiberts | 99/300 |
| 2009/0152307 A1 * | 6/2009 | Binder et al. | 222/566 |
| 2009/0211456 A1 * | 8/2009 | De Graaff et al. | 99/279 |
| 2011/0079611 A1 * | 4/2011 | Verhoeven | 222/129.3 |
| 2012/0164295 A1 * | 6/2012 | Hansen et al. | 426/474 |
| 2012/0205405 A1 * | 8/2012 | Zink et al. | 222/566 |
| 2013/0306674 A1 * | 11/2013 | Read | 222/94 |
| 2014/0332561 A1 * | 11/2014 | Rey et al. | 222/173 |

* cited by examiner

BEVERAGE PREPARATION DEVICE WITH A DEFORMABLE OUTLET PASSAGE

CROSS REFERENCE TO RELATED APPLICATIONS

The present application is the 35 U.S.C. 371 National Stage of International Application Number PCT/NL2012/050138, filed Mar. 6, 2012, which claims priority from Netherlands patent application NL2006361, filed Mar. 9, 2011, the contents of which are incorporated herein by reference.

FIELD OF THE INVENTION

The invention relates to a beverage preparation device provided with a liquid reservoir, a dispensing line connected to the reservoir and a pump for displacing liquid from the liquid reservoir to the dispensing line. The pump is connected to a control unit and is configured to supply liquid to the dispensing line at a first flow rate and at a second flow rate which is greater than the first flow rate.

PRIOR ART

Such a beverage preparation device, in particular for the preparation of instant beverages, such as coffee, is known from NL 1 023 023 in the name of the Applicant. In the known beverage preparation device, a pump supplies cold water from the cold water reservoir to a heating unit, which heats the water to a temperature just below 100° C. or equal to 100° C. Subsequently, the water is mixed in a mixing chamber with a beverage powder, such as instant coffee, in order to prepare a beverage, and the beverage is dispensed from the mixing chamber to a cup or other container via a vertical outlet nozzle. It is also possible to dispense the hot water directly without the addition of a pulverulent component, for example for preparing tea.

The known device has the drawback that, at low output flow rates, such as for example 10 ml/s, the liquid flows along the wall of the vertical outlet passage and adheres to the wall. At the position where the vertical outlet passage ends, the adhesion between the liquid and the wall results in an uncontrolled and unpredictable discharge direction from the outlet. At the location where the liquid comes away from the wall of the outlet passage, a jet of liquid forms which, on account of the force of gravity, moves in an uncontrolled flow direction to the container which has been placed under the outlet passage. This uncontrolled delivery may result in spattering and/or in the liquid partly being dispensed next to the container. If the flow rate of the liquid is increased, this may result in turbulence of the liquid. As a result thereof, the delivery of liquid is irregular. In case a venting pipe is incorporated in the dispensing line, an increase in the liquid level in the outlet passage as a result of this turbulence may cause the liquid to leave the system in an undesired way at another location.

It is an object of the invention to provide a beverage preparation device by means of which a liquid can be dispensed in a steady and controlled way. It is another object of the invention to provide a beverage preparation device in which the discharge of liquid can take place in a controlled manner at different flow rates. It is another object of the invention to provide a beverage preparation device in which the controlled discharge of liquid can be achieved essentially at ambient pressure.

SUMMARY OF THE INVENTION

To this end, a beverage preparation device according to the invention is characterized by the fact that the dispensing line comprises an outlet passage with a peripheral wall provided with at least one elastically deformable wall section, which peripheral wall surrounds a relatively small dispensing opening at the first flow rate and surrounds a larger dispensing opening at a second flow rate, with the deformable wall section having dimensions which are such that the discharge speeds of the liquid at the first and the second flow rate differ by not more than 20%, preferably by not more than 10%.

The peripheral wall is preferably composed of flexible or stiff wall sections which are connected to one another via one or more vertical hinge areas. At a low flow rate, the deformable wall section will be in the contracted or relaxed state, so that the flexible or stiff peripheral wall sections are situated close to one another and the cross section of the outlet passage is relatively small. If the flow rate is increased, the elastically deformable wall section will deform on account of the increasing pressure in the outlet passage, so that the flexible or stiff peripheral wall sections can give way and be placed at a greater distance from one another, thus increasing the cross section of the outlet passage.

The expression "elastically deformable" as used in the context of this application, is understood to mean a repeatable size increase, viewed in a cross section of the outlet passage, of the wall sections under the effect of the water pressure in the outlet passage, and a return of the increased size of the elastically deformable wall sections to a smaller equilibrium size if there is no or a decreasing water pressure.

In an alternative embodiment, the peripheral wall of the outlet passage comprises an elastic wall section which elastically deforms at increasing pressure in such a manner that a peripheral dimension of the peripheral wall increases. In this case, the elastic wall section may, for example, be annular or tubular. By expansion of the elastic wall section on all sides, an effective adjustment of the dispensing opening of the outlet passage to the set liquid flow rate at relatively high liquid pressures is achieved.

Alternatively, the wall of the outlet passage may be entirely made of elastic material.

By the choice of the deformable material, the wall thickness and the geometry of the deformable material, the deformation characteristic at increasing pressure can be set in such a manner that a virtually laminar flow is produced at any flow rate and controlled delivery is achieved.

In an embodiment of a beverage preparation device according to the invention, the peripheral wall forms a closed contour in a cross section of the outlet passage, in which the at least one deformable wall section extends in a longitudinal direction of the outlet passage.

The deformable wall section may comprise a line- or strip-shaped hinge upon deformation of which, due to increasing pressure, the peripheral wall sections connected thereto can give way.

It has been found that a star-shaped contour of the outlet passage having at least three points, with the deformable wall sections being situated at least at the location of the points as well as between adjacent points, is a suitable shape to produce a steady liquid discharge. By means of such a contour, it is possible to achieve a constant flow rate, in particular in the range around ambient pressure.

It is preferable to produce the deformable wall section from an elastically deformable material, so that the cross section of the dispensing opening quickly returns to its desired smaller size when the liquid pressure decreases.

The outlet passage with the deformable wall section can be used for dispensing both hot and cold beverages (including water). When used for dispensing hot beverages, the deformable wall section is preferably made from a heat-resistant plastic, so that it can be used in a beverage preparation device with a heating element for heating the liquid to a temperature between 60° C. and 100° C., preferably between 70° C. and 90° C. Suitable materials for producing an elastically deformable wall section are, for example, natural rubber, thermoplastic elastomer and silicone rubber.

The deformable outlet passage may have a horizontal or vertical orientation and can operate at a plurality of pressures. In an embodiment, the outlet passage is oriented substantially vertically and the liquid pressure in the outlet passage is virtually equal to the ambient pressure.

In order to be able to replace the deformable wall section in a simple manner in case of damage, it is preferred if this wall section is incorporated in a nozzle which is detachably connected to the discharge line. This nozzle may be connected to the discharge part by means of a clamp fit, threaded connection or by means of a bayonet coupling in such a manner that it can be detached by means of suitable tools.

BRIEF DESCRIPTION OF THE DRAWINGS

Some embodiments of a beverage preparation device according to the invention will be explained in more detail by way of example by means of the attached drawing, in which.

DETAILED DESCRIPTION OF THE INVENTION

Figure 1:
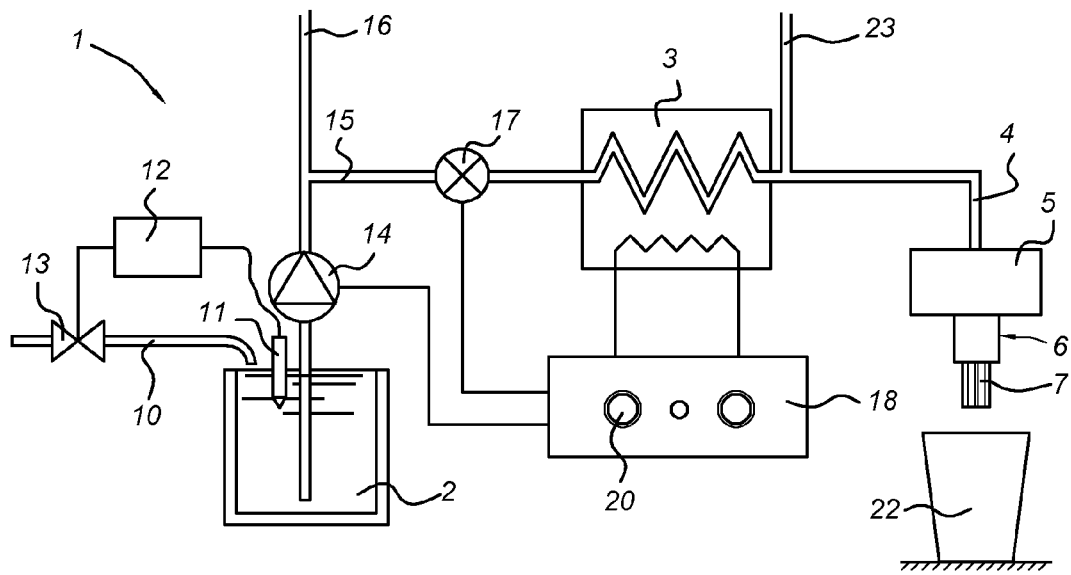
FIG. 1 shows a diagrammatic view of a beverage preparation device provided with an outlet passage with a flexible deformable wall section.

FIG. 1 shows a beverage preparation device 1, in particular a device for preparing a hot beverage, such as coffee. The device 1 comprises a cold water reservoir 2, a heating device 3, a dispensing line 4, a dispensing element 5 and an outlet passage 6. The outlet passage 6 comprises a deformable wall section, for example in the form of an elastically deformable nozzle 7.

The cold water reservoir 2 is filled via a supply line 10 which is connected to the water mains. A level sensor 11 in the cold water reservoir 10 measures the water level and supplies a measurement signal to a controller 12 which is connected to a tap 13 in the supply line 10. As soon as the water level in the reservoir 2 falls below a predetermined value, the controller 12 opens the tap 13 until the water level in the reservoir has reached a set maximum value. Cold water is supplied to the heating device 3 by means of a pump 14 via cold water line 15. A venting pipe 16 is connected to the cold water line 15 in order to allow air bubbles in this line to escape to the environment. The amount of water supplied to the heating device 3 is determined in a control unit 18 via a flow rate meter 17, and the pump is switched off when the desired amount of cold water has been supplied to the heating device 3. The control unit 18 is provided with one or more control elements 20, such as a button or key, by means of which a user can enter the desired amount of water or the desired flow rate, for example by choosing a certain type of beverage or a certain amount which may depend on the size of the container 22 (for example a small cup, mug or jug) in which the beverage is received.

The hot water, which is at a temperature of, for example, between 60° C. and 100° C., is supplied from the heating device 3 to the dispensing element 5 via the dispensing line 4. A venting pipe 23 connects the dispensing line 4 to the surroundings in order to discharge vapour bubbles in the dispensing line and to prevent overpressure from building up in this line. The dispensing element 5 may comprise a mixing chamber in which the hot water is mixed with a pulverulent substance for the preparation of a beverage as described in WO2008/013451, a bed of coffee through which the hot water is pressed, or a direct through duct for hot water in case hot water is dispensed to the container 22. Hot water flows through the outlet passage 6 and the elastic nozzle 7 to the container 22 via the outlet passage 6 at an overpressure of several tens of millibars, i.e. virtually ambient pressure, on account of the force of gravity.

In order to achieve laminar flow through the outlet passage 6 both at large flow rates (for example 70 ml/s or more) and small flow rates (for example 10 ml/s or less), the nozzle 7 is made of readily deformable, preferably elastic material, at least in strip-shaped vertical areas 21, 21' and 29, 29'.

Figure 2:
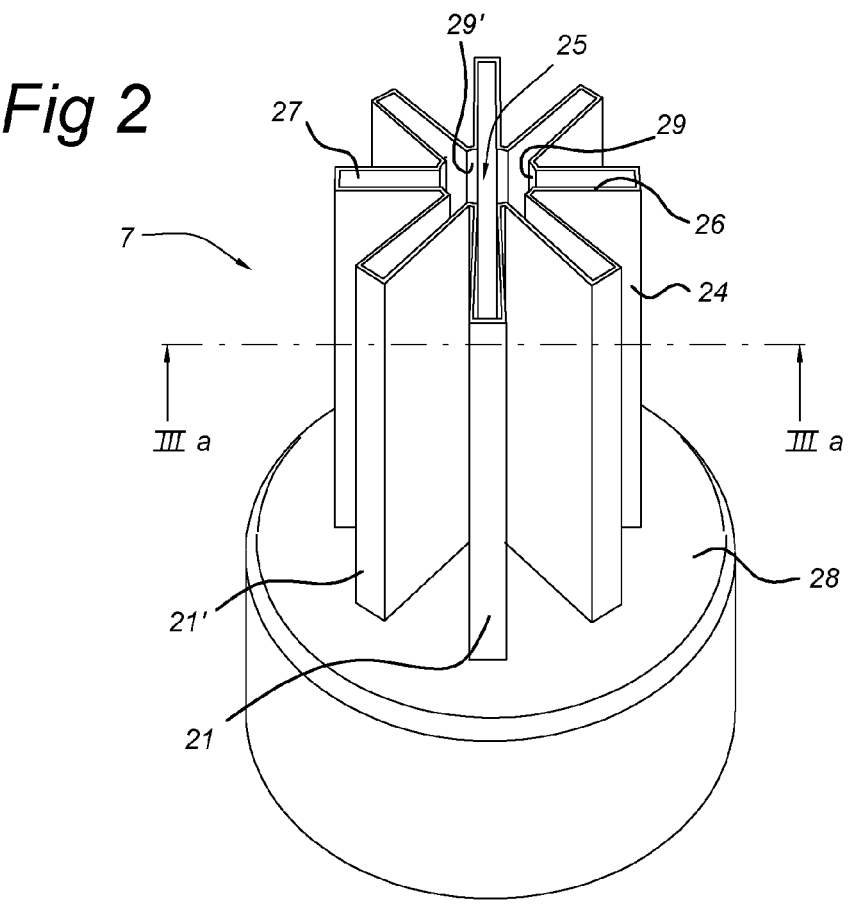
FIG. 2 shows a perspective view of a deformable nozzle with a star-shaped cross section, in particular for use at a liquid pressure which is substantially equal to ambient pressure.

As is shown in FIG. 2, the nozzle 7 is produced, for example, by injection-moulding and this nozzle comprises an outlet 24 with a central star-shaped duct 25 having at least three flexible, preferably elastic arms 26, 27, the side walls of which are moved apart on account of the liquid pressure along the strip-shaped areas 21,21' and 29,29'. The elongate outlet 24 is formed onto a base 28 which can be attached to the outlet passage 6. The base 28 may be attached to the outlet passage so as to be removable in order to be able to easily replace a damaged outlet 24 or in order to be able to clean it in a simple manner.

Figure 3A:
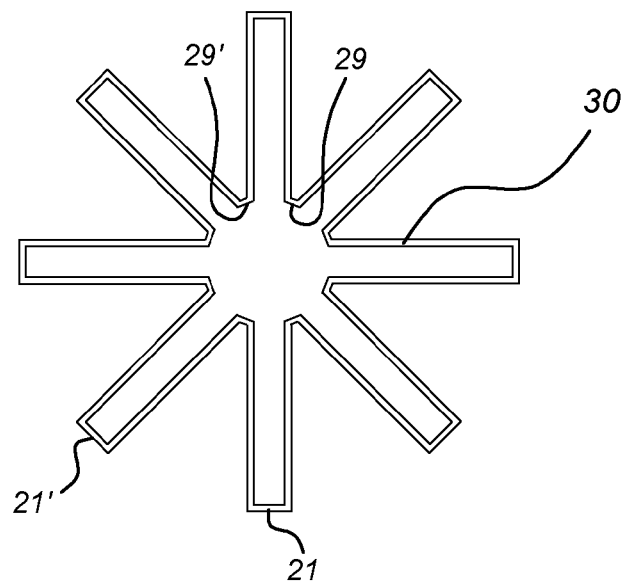
FIGS. 3a and 3b show a cross section of the deformable nozzle in the form of a closed contour at a small and a large flow rate, respectively.
Figure 3B:
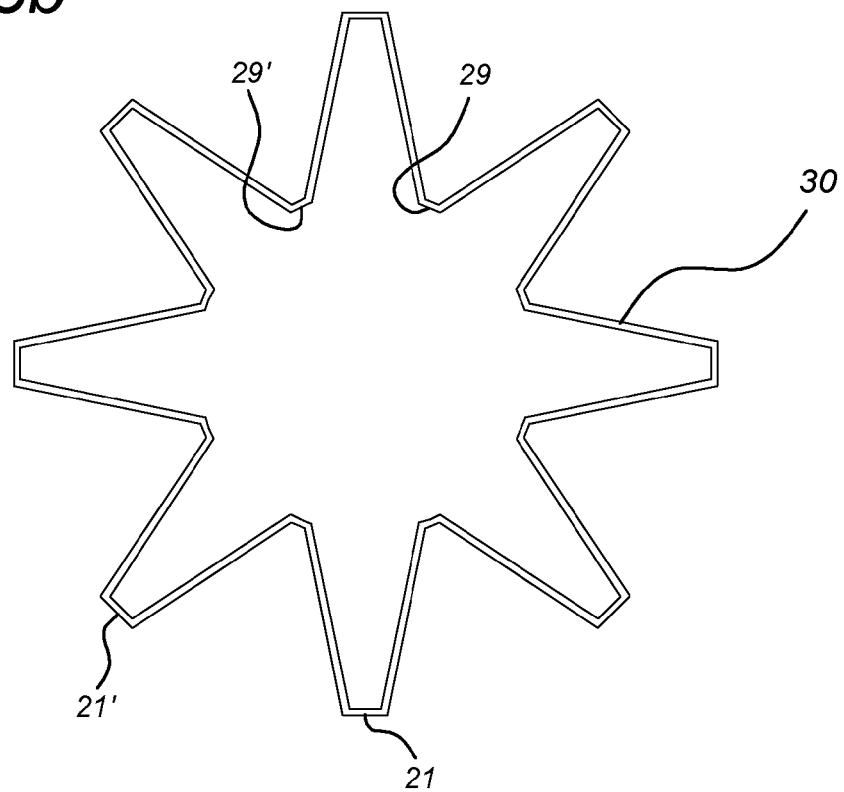

FIG. 3a illustrates the cross section through the outlet 24 along the line 3a in FIG. 2 and shows that the star-shaped closed contour 30 encloses a relatively small cross-sectional flow-through area. FIG. 3b diagrammatically shows that the closed contour 30 of the outlet deforms elastically when the flow rate increases and encloses a larger cross-sectional flow-through area, in such a manner that the flow rates in both FIG. 3a and FIG. 3b are laminar and are preferably approximately equal to one another.

Figure 4:
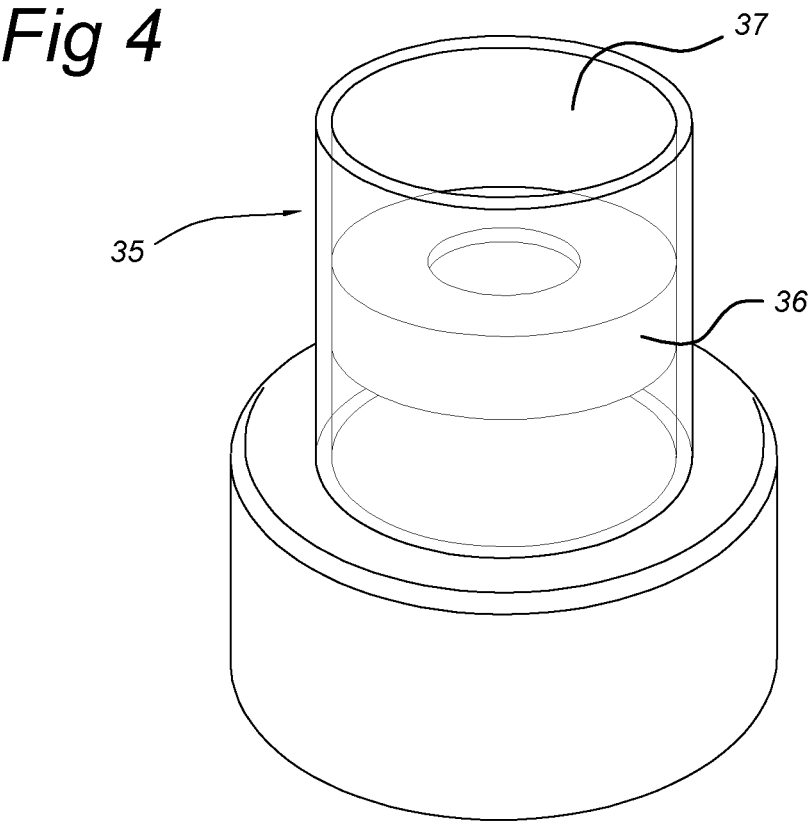
FIG. 4 shows an embodiment of a nozzle with an annular elastic wall section for use in a device in which the liquid pressure is higher than ambient pressure.

FIG. 4 shows an embodiment of a nozzle 35 in which a wall section 36 which forms an internal restriction in the outlet passage 37 and is made from an elastic material which deforms at a relatively high pressure in order to clear the outlet passage and expands when the pressure in the outlet passage 37 decreases in order to form an internal restriction.

Figure 5:
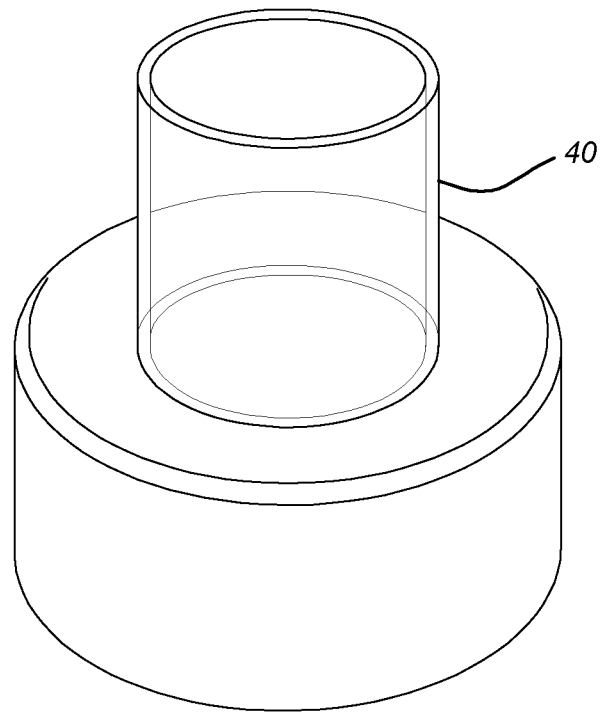
FIG. 5 shows an embodiment of a tubular elastic nozzle for use at relatively high liquid pressures.

Finally, FIG. 5 shows an embodiment in which the outlet passage 40 is made from a cylindrical elastic material, for example in the form of a rubber hose or a hose made from another suitable elastic plastic.

The embodiments according to FIG. 4 and FIG. 5 operate at relatively high liquid pressures and are less suitable for use with beverage preparation devices according to FIG. 1 which are provided with a venting pipe, as the higher liquid pressure may result in water flowing back to the venting pipe.

The invention claimed is:

1. Beverage preparation device (1) provided with a liquid reservoir (2), a dispensing line (4) connected to the reservoir and a pump (14) for displacing liquid from the liquid reservoir (2) to the dispensing line (4), wherein the pump is connected to a control unit (18) and is configured to supply said liquid to the dispensing line at a first flow rate and at a second flow rate which is greater than the first flow rate, characterized in that the dispensing line comprises an outlet passage (6) with a peripheral wall provided with a plurality of elastically deformable wall sections (7, 21,21', 26, 29,29'), said peripheral wall surrounds a relatively small dispensing opening at the first flow rate and surrounds a larger dispensing opening at a second flow rate, the peripheral wall forms a closed contour (30) in a cross section of the outlet passage (6), in which the deformable wall sections extend in a longitudinal direction of the outlet passage, wherein the contour (30) is star-shaped, wherein the star-shaped contour has at least three points and the deformable wall sections (21,21';29,29') are situated at least at the location of the points as well as between adjacent points, the deformable wall section having dimensions which are such that the discharge speeds of the liquid at the first and the second flow rate differ by not more than 20% or by not more than 10%.

2. Beverage preparation device (1) according to claim 1, wherein the deformable wall sections are elastically deformable.

3. Beverage preparation device (1) according to claim 2, wherein a heating device (3) is incorporated between the liquid reservoir (10) and the dispensing line (4) for heating the liquid to a temperature between 60° C. and 100° C.

4. Beverage preparation device (1) according to claim 3, wherein the outlet passage (6) is oriented substantially vertically and the liquid pressure in the outlet passage is virtually equal to the ambient pressure.

5. Beverage preparation device (1) according to claim 4, wherein the elastic wall section (7,36) is incorporated in a nozzle which is detachably connected to the discharge line.

6. Beverage preparation device (1) according to claim 3, wherein a heating device (3) is incorporated between the liquid reservoir (10) and the dispensing line (4) for heating the liquid to a temperature between 70° C. and 90° C.

7. Beverage preparation device (1) according to claim 1, wherein the deformable wall sections are elastically deformable.

8. Beverage preparation device (1) according to claim 1, wherein a heating device (3) is incorporated between the liquid reservoir (10) and the dispensing line (4) for heating the liquid to a temperature between 60° C. and 100° C.

9. Beverage preparation device (1) according to claim 8, wherein a heating device (3) is incorporated between the liquid reservoir (10) and the dispensing line (4) for heating the liquid to a temperature between 70° C. and 90° C.

10. Beverage preparation device (1) according to claim 1, wherein the outlet passage (6) is oriented substantially vertically and the liquid pressure in the outlet passage is virtually equal to the ambient pressure.

11. Beverage preparation device (1) according to claim 1, wherein the elastic wall section (7,36) is incorporated in a nozzle which is detachably connected to the discharge line.

12. Outlet passage (6) for use in a beverage preparation device (1) according to claim 1.

* * * * *